UNITED STATES PATENT OFFICE.

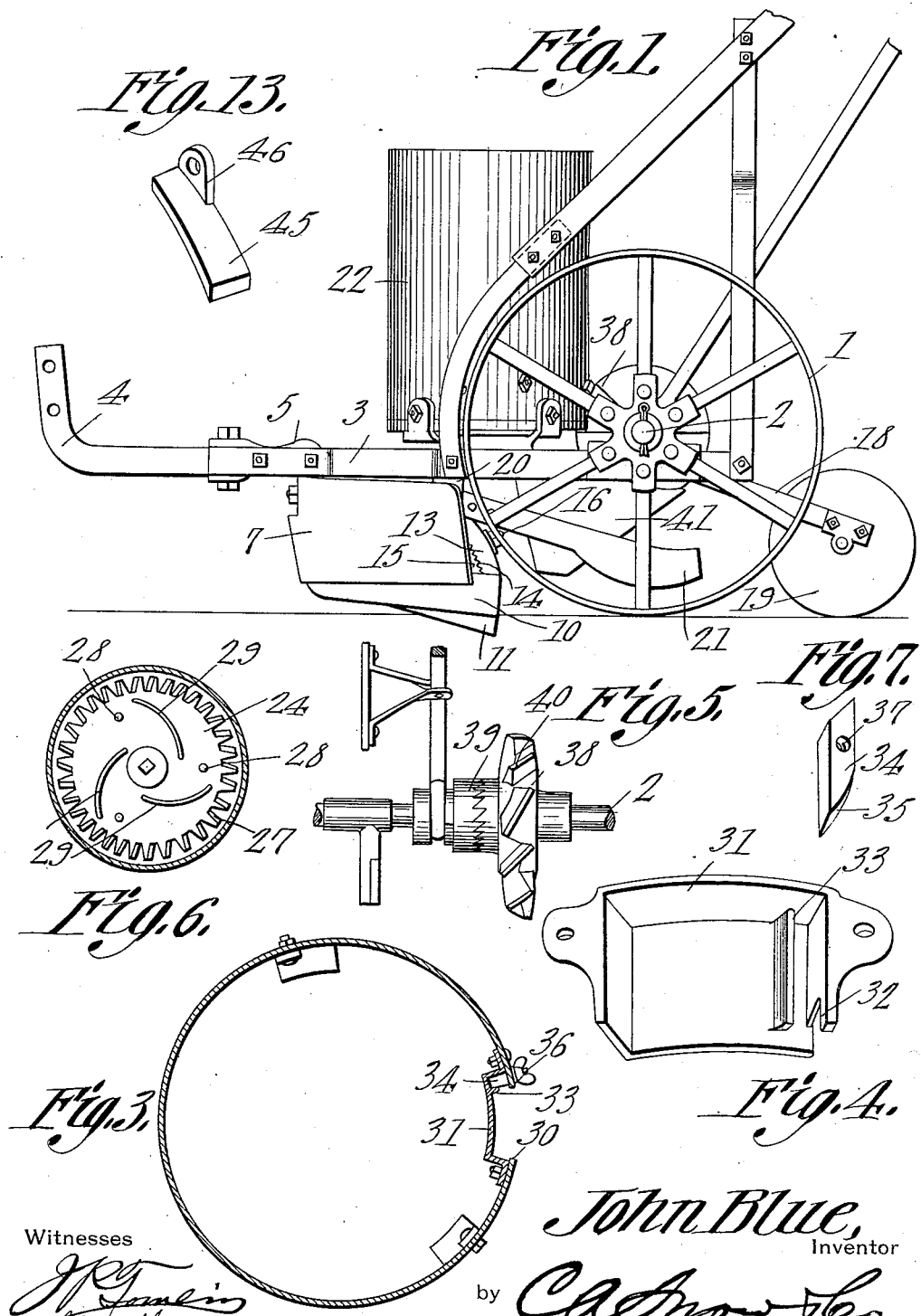

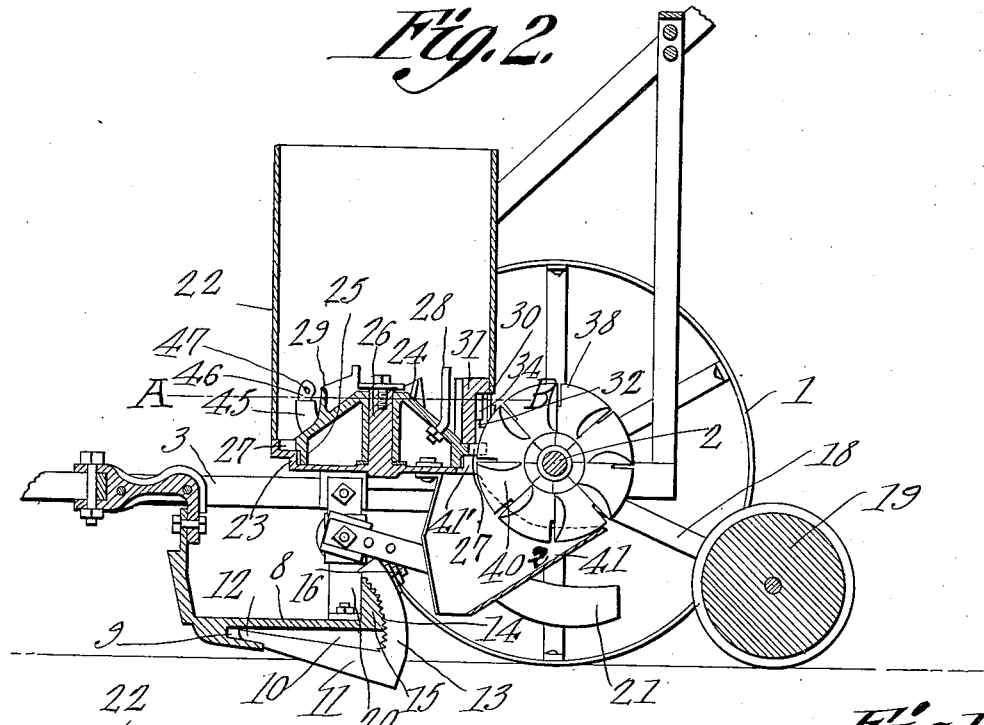

JOHN BLUE, OF LAURINBURG, NORTH CAROLINA.

PLANTER.

1,095,621.  Specification of Letters Patent.  Patented May 5, 1914.

Application filed August 7, 1913. Serial No. 783,633.

*To all whom it may concern:*

Be it known that I, JOHN BLUE, a citizen of the United States, residing at Laurinburg, in the county of Scotland and State of North Carolina, have invented a new and useful Planter, of which the following is a specification.

This invention relates to planters and more particularly to machines of this type designed for planting cotton seeds.

One of the objects of the invention is to provide improved means whereby any desired number of seeds can be dropped at one time whereby the dropping of the seeds can be effected practically continuously or intermittently, as desired.

A further object is to provide a dropping plate coöperating with a combined actuating and seed ejecting device receiving motion directly from the rotating axle of the supporting wheels.

A further object is to provide improved means for agitating the seeds and for preventing the discharge of an excessive number.

Another object is to provide a novel form of furrow opener.

A further object is to provide improved means for smoothing the soil in advance of the opener.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of the machine. Fig. 2 is a central vertical section therethrough. Fig. 3 is a horizontal section through the seed hopper, the working parts being removed said section being taken on the line A—B Fig. 2. Fig. 4 is a perspective view of the gate housing. Fig. 5 is a detail view of the ejecting wheel and adjacent parts. Fig. 6 is a plan view of the combined agitator and dropping plate. Fig. 7 is a detail view of the gate. Fig. 8 is a rear elevation of the seed hopper with parts removed. Fig. 9 is a perspective view of the smoother. Fig. 10 is a detail view of the furrow opener. Fig. 11 is a rear elevation of a modified form of ejecting wheel. Fig. 12 is a side elevation of said wheel. Fig. 13 is a perspective view of an interior packer used in connection with the planter. Fig. 14 is a view partly in section and partly in elevation showing a modified form of interior packer.

Referring to the figures by characters of reference 1 designates supporting wheels mounted to rotate with an axle 2, this axle supporting the rear portion of a frame 3 having a clevis 4 connected to the front end thereof. A hanger 5 extends from the front end portion of the frame and projects into the front portion of a V-shaped scraper 7 having vertical rearwardly diverging side walls connected at their lower edges by a bottom plate, 8, this bottom plate being flat so as to constitute an efficient smoother. A socket 9 is formed on the bottom of the smoother adjacent the front end at the center thereof and extending rearwardly from this socket are flanges 10 between which extends a furrow opener 11. This furrow opener has a tongue 12 at its front end extending loosely into the socket 9 and the rear end of the furrow opener has an arcuate upstanding arm 13 provided with transverse teeth 14 on its concaved face adapted to engage corresponding teeth formed upon a lug 15 upon the back portion of the bottom 8. A bolt 16 extends through a slot 17 in arm 13 and the lug and serves to hold the arm and lug clamped together. Thus it will be seen that the furrow opener can be adjusted angularly relative to the scraper, it being understood that the bolt 16 extends through an elongated slot 17 in the arm 13. Arms 18 are pivotally connected to the sides of the frame 3 and extend downwardly and rearwardly therefrom, there being a smoothing roller 19 journaled between the arms.

The rear portion of the front smoother is connected to frame 3 by means of a U-shaped hanger or bracket 20 and adjustably connected to the sides of this bracket are rearwardly extending covering blades 21 terminating in front of the roller 19.

Mounted on the frame 3 and above the hanger or bracket 20 is a cylindrical seed box or hopper 22 having a central circular depression 23. A frusto-conical seed plate 24 is mounted for rotation upon the bottom of the seed hopper and has a circular flange 25 extending downwardly within the depression 23. This plate 24 is mounted for rotation upon a central stud 26 projecting upwardly from the bottom of the seed hopper. Teeth 27 project from the periphery of the plate and constitute gear teeth. Agitating fingers 28 extend upwardly from the plate adjacent the gear teeth and mounted upon the plate 24 at suitable intervals are obliquely disposed agitating and deflecting ribs 29 designed, when the seed plate is rotated, to deflect the seeds laterally toward the walls of the seed hopper. An opening 30 is formed in the wall of the hopper at the back thereof and secured inside of the hopper and across this opening is a housing 31 one side of which is provided with an opening 32 through which seeds are adapted to be fed into the housing 31. A guide rib 33 is arranged within the housing and disposed between this guide rib and the apertured end wall of the housing is a gate 34. That face of the gate nearest opening 32 is rounded, as shown at 35 in Fig. 7 and a screw 36 is adapted to extend within an opening 37 in the gate and through a slot in the wall of hopper 22 so that, by tightening this screw, the gate 34 can be secured at any desired elevation. The teeth of the seed plate are adapted to work under the housing 31.

Mounted on the axle 2 is a combined actuating and ejecting wheel 38 adapted to be coupled to the axle by means of a clutch 39 which can be operated in any suitable manner, this clutch, when disengaged from the wheel, permitting the axle to rotate independently of the wheel. The periphery of the wheel is provided with a series of obliquely disposed wings or teeth 40 adapted to work successively between the teeth 27 on the feed plate. Thus it will be seen that, as the wheel 38 rotates with the axle, the teeth 40 will successively engage the teeth on the feed plate and cause said feed plate to rotate in the hopper 22. Seeds seated between the teeth of the feed plate will be carried by said rotating plate under the gate 34 and into position back of the opening 30 where they will be ejected by the teeth 40 and caused to drop into a boot 41 supported under the rear portion of the hopper 22, it being understood that the bottom of the hopper is cut away under the housing 31, as shown at 41'. By having the teeth 40 obliquely disposed throughout their length, it will be seen that a practically continuous rotation of the feed plate results from the rotation of wheel 38. If, however, the teeth 40 are disposed with portions thereof obliquely arranged and additional portions extending in a plane disposed at right angles to the axle 2, as shown for example in Fig. 11, an intermittent rotation of the feed plate will be effected. In other words, the obliquely disposed portions 42 of the wheel 43 will shift the feed plate while in engagement with teeth 27 while the flat portions 44 of the teeth will maintain the feed plate stationary during the rotation of the wheel 43.

In order that the seeds may be properly packed between the teeth 27, a packer is arranged within the hopper 22, one form of packer consisting of a plate 45 having an ear 46 which is secured to the wall of the hopper by a bolt 47. This bolt, when tightened, holds the packer 45 against movement but, by loosening the bolt, the packer can be adjusted angularly so that the seeds will be pressed downwardly between teeth 27 with any desired degree of pressure. Instead of utilizing a packer such as shown in Fig. 13, a toothed wheel 48 may be journaled within the hopper 22 so that its teeth will successively work between the teeth 27 and thus pack seeds in the spaces between the teeth. Obviously when the machine is moving forward the feed plate will be rotated in the manner described and the deflecting ribs 29 will not only agitate the seeds but will shove them toward the wall of the hopper where they will pass under the packer 45 and thus be compressed within the spaces between the teeth 27. The feed plate 24 is rotated by the wheel 38 or 43, thus causing the seeds between teeth 27 to be carried under the gate 34 and into position back of the opening 30. Here the seeds will be engaged by the teeth of the wheel 38 or 43 and ejected from between the teeth 27 while the feed plate is being rotated. The ejected seeds will drop into the boot $40^2$ and be deposited into the furrow after which the seeds will be covered by the blades 21 and then smoothed by the roller 19.

What is claimed is:—

1. A planter including a feed plate mounted for rotation and having gear teeth radiating therefrom, the spaces between the teeth constituting seed receiving spaces, and a wheel having obliquely disposed wings for passing through the spaces between the teeth of the feed plate to intermittently rotate said plate and eject the seeds from between the teeth.

2. The combination with a revoluble feed plate having peripheral teeth forming seed receiving spaces therebetween, of revoluble means for engaging said teeth to rotate the said feed plate intermittently and eject the seeds from between the teeth, and revoluble means actuated by said teeth for packing the seeds in said spaces prior to reaching the ejecting means.

3. In a planter, the combination with a hollow frusto-conical feed plate, of agitating fingers extending upwardly from the plate, means within the plate for engaging and fastening the fingers, obliquely disposed curved deflecting ribs on the plate and between the fingers for directing the seeds horizontally away from the plate, and peripheral teeth upon the plate and providing seed receiving spaces therebetween, and means for rotating the plate.

4. In a planter, the combination with a hollow frusto-conical feed plate, of agitating fingers extending upwardly from the plate, means within the plate for engaging and fastening the fingers, obliquely disposed curved deflecting ribs on the plate and between the fingers for directing the seeds horizontally away from the plate, peripheral teeth upon the plate and providing seed receiving spaces therebetween, and means working through said spaces for rotating the plate and removing seeds from the spaces.

In testimony that I claim the foregoing as my own, I have hereto affixed my signature in the presence of two witnesses.

JOHN BLUE.

Witnesses:
W. H. COOPER,
A. K. CURRIE.

Copies of this patent may be obtained for five cents each, by addressing the "Commissioner of Patents, Washington, D. C."